United States Patent
Srinivasan et al.

(10) Patent No.: US 8,867,841 B2
(45) Date of Patent: Oct. 21, 2014

(54) INTELLIGENT CROPPING OF IMAGES BASED ON MULTIPLE INTERACTING VARIABLES

(75) Inventors: Balaji Srinivasan, Fremont, CA (US); Brett Rolston Lider, San Francisco, CA (US); Zach Yeskel, San Francisco, CA (US); Alison Boncha, San Francisco, CA (US)

(73) Assignee: Google Inc., Mountain View, CA (US)

( * ) Notice: Subject to any disclaimer, the term of this patent is extended or adjusted under 35 U.S.C. 154(b) by 69 days.

(21) Appl. No.: 13/569,760

(22) Filed: Aug. 8, 2012

(65) Prior Publication Data

US 2014/0044358 A1    Feb. 13, 2014

(51) Int. Cl.
*G06K 9/46* (2006.01)

(52) U.S. Cl.
CPC ........................ *G06K 9/46* (2013.01)
USPC ........... 382/190; 382/100; 382/118; 382/195; 382/224; 382/305

(58) Field of Classification Search
CPC . G06K 9/00234; G06K 9/00677; G06K 9/52; G06K 9/46; G06K 9/00221; G06K 9/00288; H04N 1/32144; H04N 1/00005; H04N 1/00331; H04N 1/32304; H04N 1/3232; H04N 19/00769; H04N 9/8233; H04N 21/4122; G01S 13/04; G01S 15/04; G01S 15/06; G06F 17/30247; G06F 17/30268; G06F 15/16; G06F 17/30256; G06F 17/30029; G06T 2207/20132; G06T 7/0081; H04L 51/32
USPC .................. 382/100, 118, 190, 195, 224, 305
See application file for complete search history.

(56) References Cited

U.S. PATENT DOCUMENTS

| | | | | |
|---|---|---|---|---|
| 7,187,780 B2 * | 3/2007 | Tian et al. | ..................... | 382/100 |
| 7,274,822 B2 * | 9/2007 | Zhang et al. | .................. | 382/224 |
| 7,636,450 B1 * | 12/2009 | Bourdev | ....................... | 382/100 |
| 7,756,291 B2 * | 7/2010 | Lennington et al. | .......... | 382/100 |
| 8,259,995 B1 * | 9/2012 | Schendel et al. | .............. | 382/103 |
| 8,396,246 B2 * | 3/2013 | Anbalagan et al. | ........... | 382/100 |
| 2006/0072847 A1 * | 4/2006 | Chor et al. | .................... | 382/282 |
| 2009/0096808 A1 * | 4/2009 | Winn et al. | .................... | 345/594 |
| 2009/0196510 A1 * | 8/2009 | Gokturk et al. | ............... | 382/224 |
| 2010/0050090 A1 * | 2/2010 | Leebow | ....................... | 715/751 |
| 2010/0054600 A1 * | 3/2010 | Anbalagan et al. | ........... | 382/180 |
| 2010/0054601 A1 * | 3/2010 | Anbalagan et al. | ........... | 382/180 |
| 2011/0075884 A1 * | 3/2011 | Baker et al. | .................... | 382/103 |
| 2011/0211736 A1 * | 9/2011 | Krupka et al. | ................ | 382/118 |

\* cited by examiner

*Primary Examiner* — Vu Le
*Assistant Examiner* — Aklilu Woldemariam

(57) ABSTRACT

Methods and systems for intelligently cropping images, including receiving, over a computer network, a source image, and then associating a first identifier tag with a first object in the source image. A cropped image is generated from the source image wherein the cropping is based on the first object. The system and method then notifying a first user that the first identifier tag is associated with the first object in the cropped image, wherein the notification includes the cropped image.

24 Claims, 12 Drawing Sheets

US 8,867,841 B2

INTELLIGENT CROPPING OF IMAGES BASED ON MULTIPLE INTERACTING VARIABLES

BACKGROUND

The Internet provides access to a wide range of resources with one of the fastest growing uses being social media. Social media includes web-based and mobile-based technologies that provide for interactive dialogues of user-generated content. Such content includes text, photos, videos, magazines, internet forums, weblogs, social blogs, podcasts, rating, geographic tracking, and social bookmarking.

Using social media a user can post a piece of content, e.g., a photo, and within seconds that content is accessible by a large number of people and in some cases over one-hundred million people. Such access to information is both exhilarating and also daunting. For example, a photo of a person could get posted to a social media site, which results in that person receiving a message that they have been tagged in a photo. The message indicates that a photograph that includes their image has been posted to the social media site, but gives no indication as to the contents of the image. The photo could contain just the single person or include other people and other objects. The photographed person has no immediate indication of the contents of the photo without farther investigation.

BRIEF SUMMARY

Embodiments include systems and methods for intelligently cropping images for notification in a social media setting where the cropping is based upon multiple factors. Such factors can include the status of the object in the image, e.g., owner, poster, tagger, taggee, general observer, whether the object is a person, target device, resolution, and other similar factors.

According to an embodiment, a method is presented that provides for intelligently cropping images that includes receiving, over a computer network, a captured or source image and then associating a first identifier tag with a first object in the source image. The method continues by generating a cropped image from the source image, wherein the cropping is based on the first object. The method continues by notifying a first user that the first identifier tag is associated with the first object in the cropped image and also includes a copy of the cropped image. The source image can be an image obtained from an image capture device, e.g., a camera, or it can be a synthetically generated image.

According to another embodiment, a method is presented that provides for intelligently cropping images that includes sending a source image to a social media website and then receives notification that a first identifier tag is associated with a first object in the source image. The method also includes that the received notification includes receiving a cropped image from the source image where the cropping is based on the first object.

According to another embodiment, a system is provided that includes a processor, memory coupled to the processor, an image storage module, an association module, an image cropping module, and a notification module. The image storage module stores uploaded source images. The association module associates a first identifier tag with a first object in the source image. The image cropping module generates a cropped image from the source image where the cropping is based on the first object. The notification module notifies a first user that the first identifier tag is associated with the first object in the cropped image and also includes a copy of the cropped image in the notification.

Further embodiments, features, and advantages, as well as the structure and operation of the various embodiments are described in detail below with reference to accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

The accompanying drawings, which are incorporated herein and form part of the specification, illustrate embodiments of the present invention and, together with the description, further serve to explain the principles of the invention and to enable a person skilled in the relevant art(s) to make and use the invention.

DETAILED DESCRIPTION

I. Introduction

Embodiments are described herein with reference to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

What are needed are systems and methods that intelligently crop identified objects from an image posted in a social media setting, and based upon criteria and attributes of the identified person or object in the photo, send the intelligently cropped image with a notification that the person has been tagged to the identified person or object.

Social media may refer to any form of internet based communication that allows for the creation and exchange of user-generated content. Cropping of an image refers to the identification and/or removal of an area of an image. Cropping is typically performed to remove unwanted subject material from the image to improve the overall composition of the image, to emphasize a certain set of subject matter, or to remove subject matter that is undesirable in a particular situation. Cropping is also performed to compensate for different aspect ratios. For example a widescreen 16:9 format may be cropped to a 1:1 ratio for display on a mobile device.

The embodiments described herein are referred in the specification as "one embodiment," "an embodiment," "an example embodiment," etc. These references indicate that the embodiment(s) described can include a particular feature, structure, or characteristic, but every embodiment does not necessarily include every described feature, structure, or characteristic. Further, when a particular feature, structure, or characteristic is described in connection with an embodiment, it is understood that it is within the knowledge of one skilled in the art to affect such feature, structure, or characteristic in connection with other embodiments whether or not explicitly described.

Figure 1:
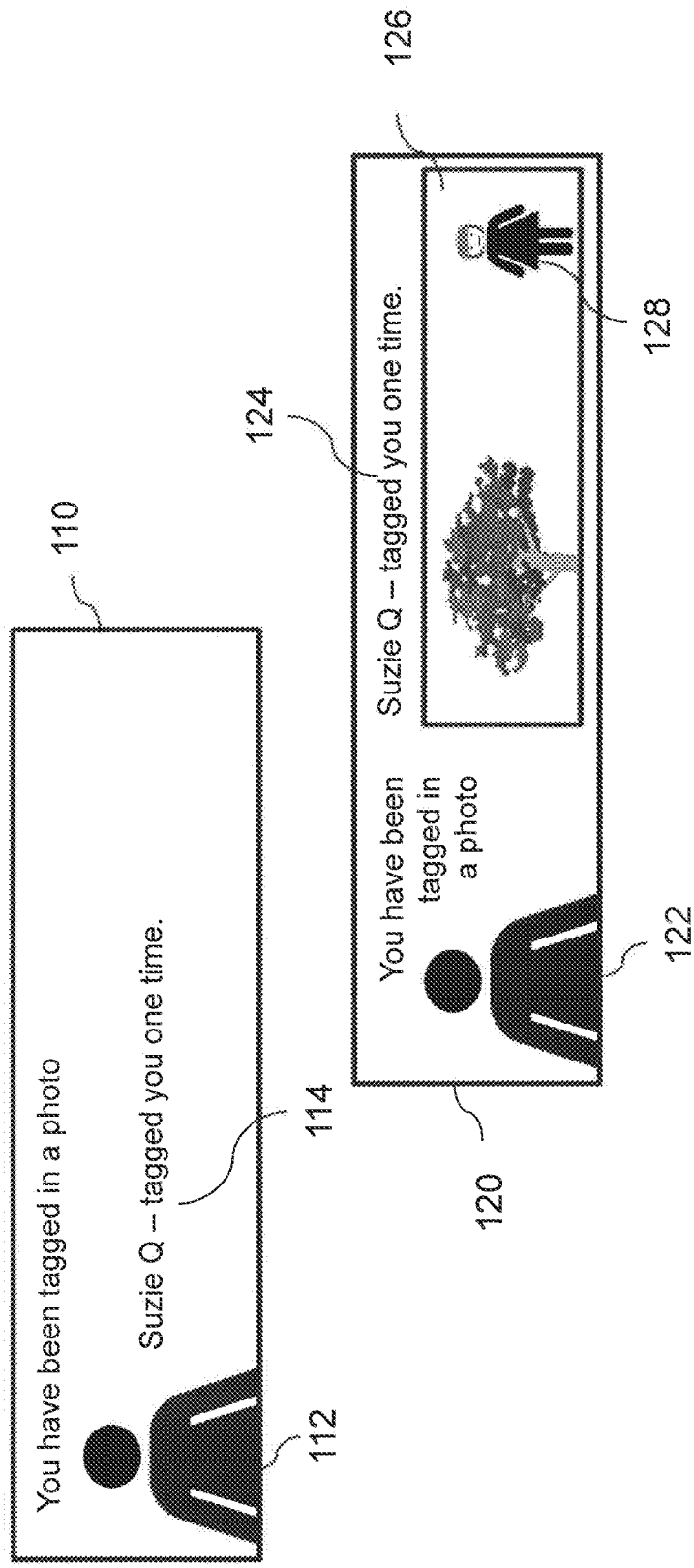
FIG. 1 illustrates an example notification in a social media system with and without an intelligently cropped image, according to an embodiment.

FIG. 1 illustrates two example notifications possible in a social media system, according to an embodiment of the present invention. Notification 110 illustrates a notification to a user that includes the user's icon 112 and a message 114. In this example, message 114 informs the user that "Suzie Q" has posted an image that supposedly includes a photo that contains an image of the user. In this example message 114 includes only text and does not give the user an indication of what image has been posted.

Notification 120 illustrates a notification to a user that includes the user's avatar icon 122 and a message 124, which as in notification 110, notifies the user that "Suzie Q" has posted an image that supposedly includes a photo that contains an image of the user. However, notification 120 also includes a cropped image 126 of the photo that includes the supposed image of the user 128. In this manner the user is able to quickly identify the actual photo that was posted.

II. System Overview

Figure 2:
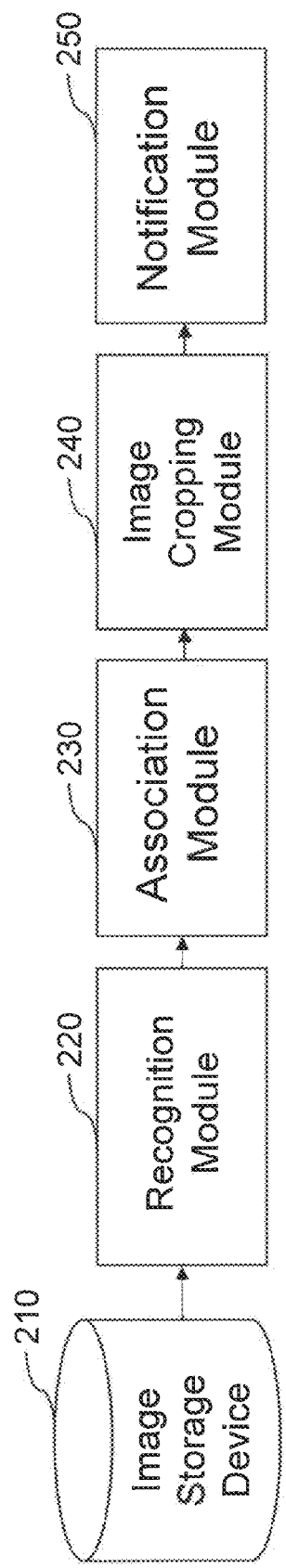
FIG. 2 illustrates an intelligent cropping system, according to an embodiment.

FIG. 2 illustrates an intelligent cropping system 200, according to an embodiment. Intelligent cropping system 200 includes an image storage device 210, a recognition module 220, an association module 230, an image cropping module 240, and a notification module 250.

Image data is received and stored in image storage device 210 where the image data can exist in any defined image format, for example, jpg, bmp, exif, tiff, raw, png, gif, ppm, pgm, pbm, pnm, cgm, svg, pns, jps, or mpo, or any other format, whether the image is two dimensional or three dimensional. Image data storage device 210 may exist as a standalone device or be integrated into another device such as a mobile communications device, digital camera, or any other image capture device.

Recognition module 220 analyzes a source image to identify objects and/or people within the image. Recognition can include not only identifying a person, or a person's face, but can also compare the identified features to a feature database (not shown) to identify a name associated with the face. In the same manner, recognition module 220 can identify objects within the image and through a feature database to recognize various logos, e.g., a canned beverage is a Coca-Cola branded product. Objects can be anything, such as an animal, a brand, a plant, etc.

Association module 230 uses the analysis of recognition module 220 to associate an identifier tag with an identified object or person within the source image. Association module 230 can generate multiple identifier tags to be associated with multiple objects and/or persons within an image. Association module 230 may also generate tags based upon the affinity of the recipient to the object in question. For example, if the source image contains a Coke can and the recipient had previously post about soda or Coke, then Association module 230 can tag that object.

Image cropping module 240 intelligently crops the source image based on the objects and/or people identified by recognition module 220 and associations made by association module 230. In an embodiment, image cropping module 240 intelligently and automatically crops the source image based and generates a composite image containing the identified people/objects. In another embodiment, a user will perform the functions of recognition module 220 and association module 230 by identifying and associating a person or object of interest. Alternatively, a semi-automatic approach can be implemented that uses both recognition module 220 and association module 230 and further allows a user to provide, revise, update, or confirm recognized objects and/or people identified and associations made.

Image cropping module 240 will then crop the image based on the identification and association performed either by system 200 or a user. The methodology behind the cropping of the image will be discussed in further detail later.

Notification module 250 notifies the person or object that was associated with an identifier tag of the existence of the cropped image and that the associated person or object exists within the cropped image. Notification module 250 also delivers a copy of the cropped image to the associated person or object.

III. Captured/Associated Image

Figure 3:
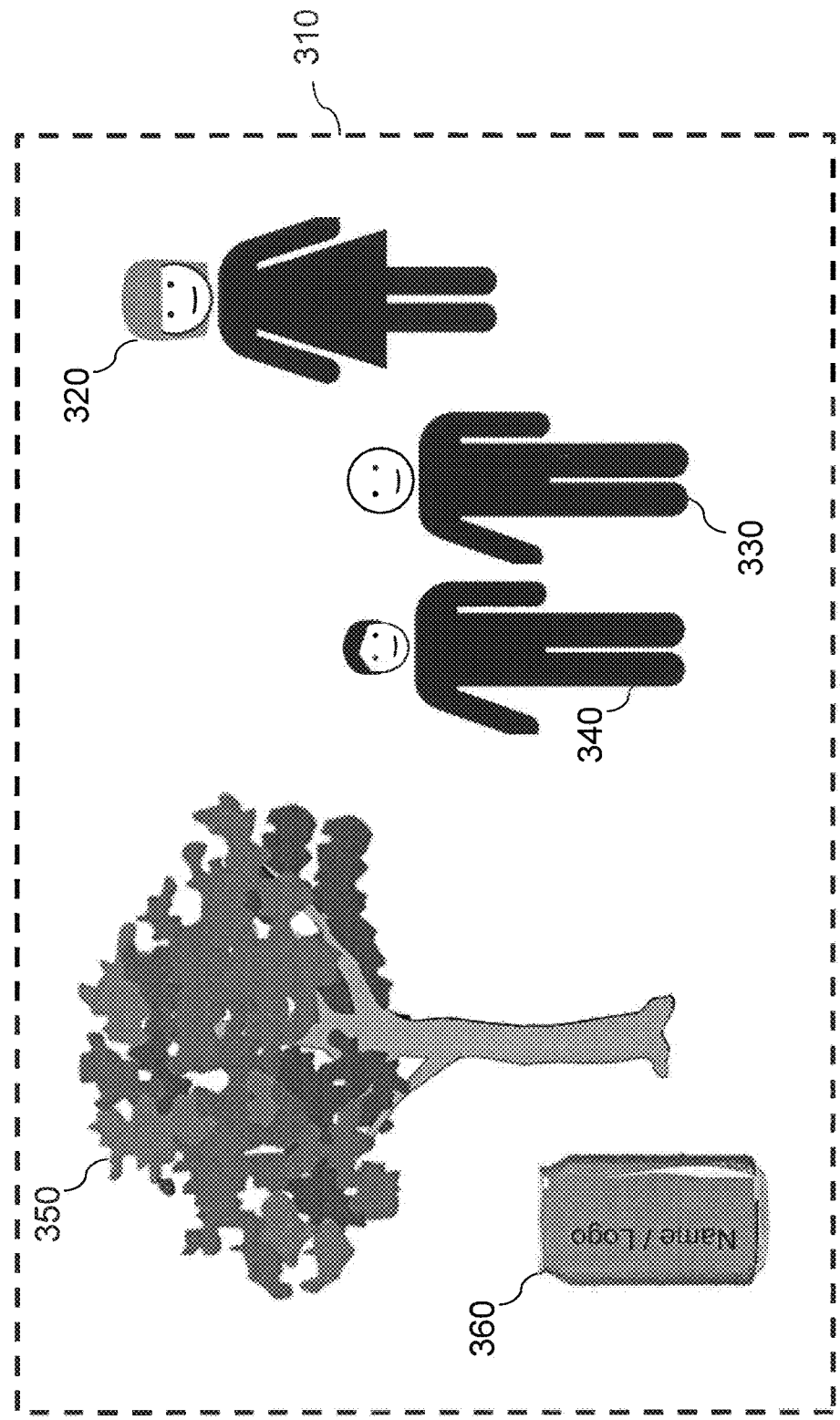
FIG. 3 is an example source image illustrating identified objects, according to an embodiment.

FIG. 3 is an example source image 310, according to an embodiment. Source image 310 includes both objects and people. For example, source image 310 includes person 320, person 330 and person 340. Source image 310 also includes objects 350 and 360, where object 350 is a tree and object 360 is a beverage can.

The people and objects in source image 310 can either manually or automatically, using a computer-based system, be recognized. Persons 320, 330 and 340 can be automatically recognized and thus associated with an identifier tag using a facial recognition system, or manually by another person. Objects, such as object 360, can be recognized, and associated with an identifier tag based on shape, character recognition, or by logo. Objects, such as object 350, can likewise be identified as a tree, either automatically or manually.

IV. Intelligent Cropping

Figure 4:
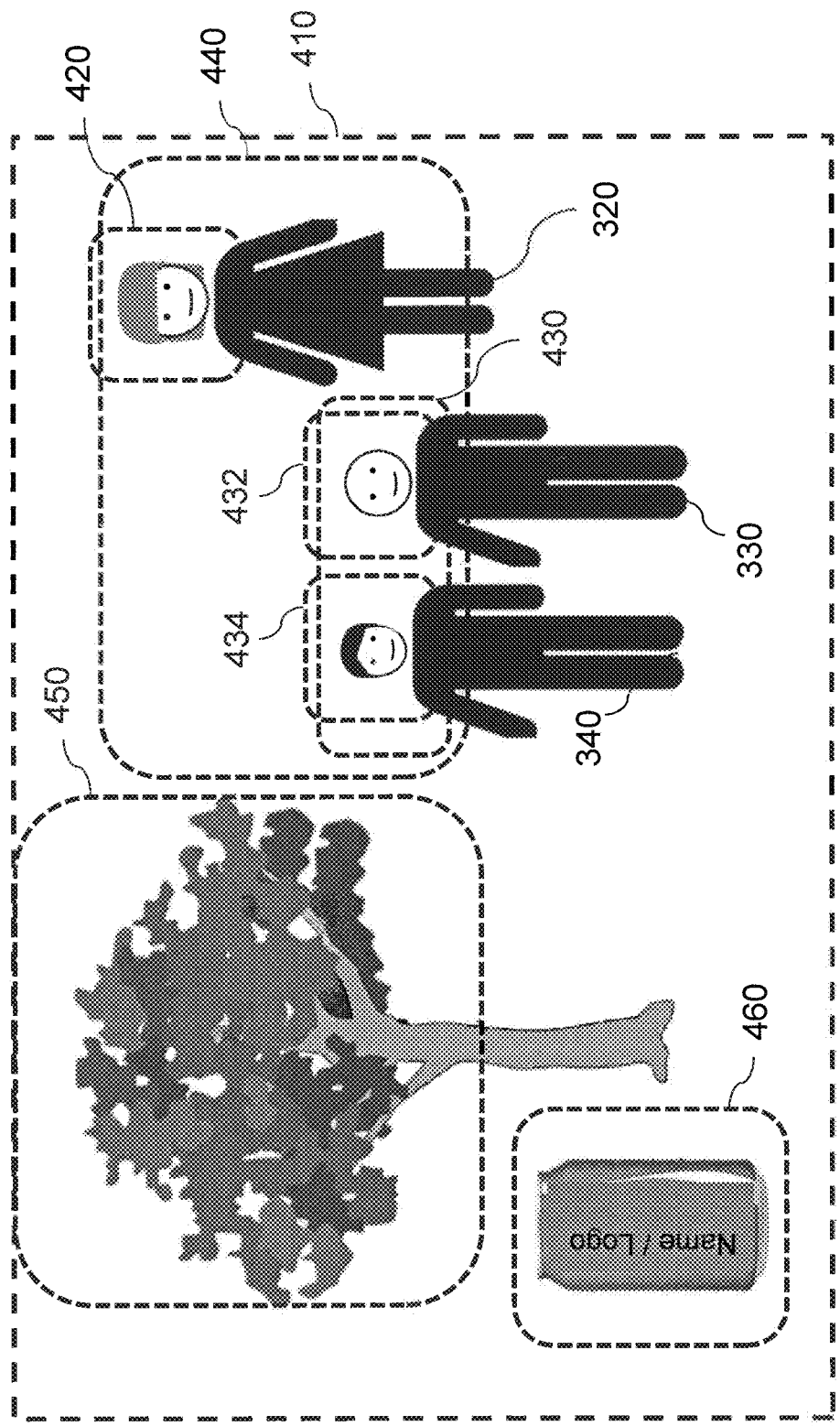
FIG. 4 illustrates multiple grouping of the identified objects within the source image based on the status of the person or object receiving a notification, according to an embodiment.

FIG. 4 is an example source image 410 with multiple intelligent cropped areas, according to an embodiment. Source image 410 includes both objects and people that have been identified and associated with an identifier tag. Intelligent cropping is based on a set of pre-defined rules consistent with a social media website that would guide the actions of image cropping module 240. For example, the person that took image 410 is considered the owner of the image. The owner has access to all of the images contained within image 410. However, for example, if the owner posts image 410 to a social media website and a third party recognizes one of the individuals in the image, e.g., person 320, then person 320 would receive a notification that they have been tagged in a photo. Intelligent cropping system 200 would create an intelligently cropped image that would only include cropped area 420 that includes person 320. In another embodiment, the cropped area would include the person 320 and an amount of area around person 320 to give some context as to the location or situation surrounding person 320.

In another embodiment, the cropped area would include the person 320 and an amount of area around person 320 to give some context as to the location or situation surrounding person 320. In general, cropping of the image is necessary as there is not enough space to display the entire image in the summary view of the notification. Therefore, the priority is to notify the user that they have been tagged and limit the image to include only person 320. In an embodiment, the owner of the photo receives a notification that includes a composite image including images of everyone that has been tagged. In another embodiment, the user's notification would include a composite image that includes image of everyone that has been tagged.

Figure 5:
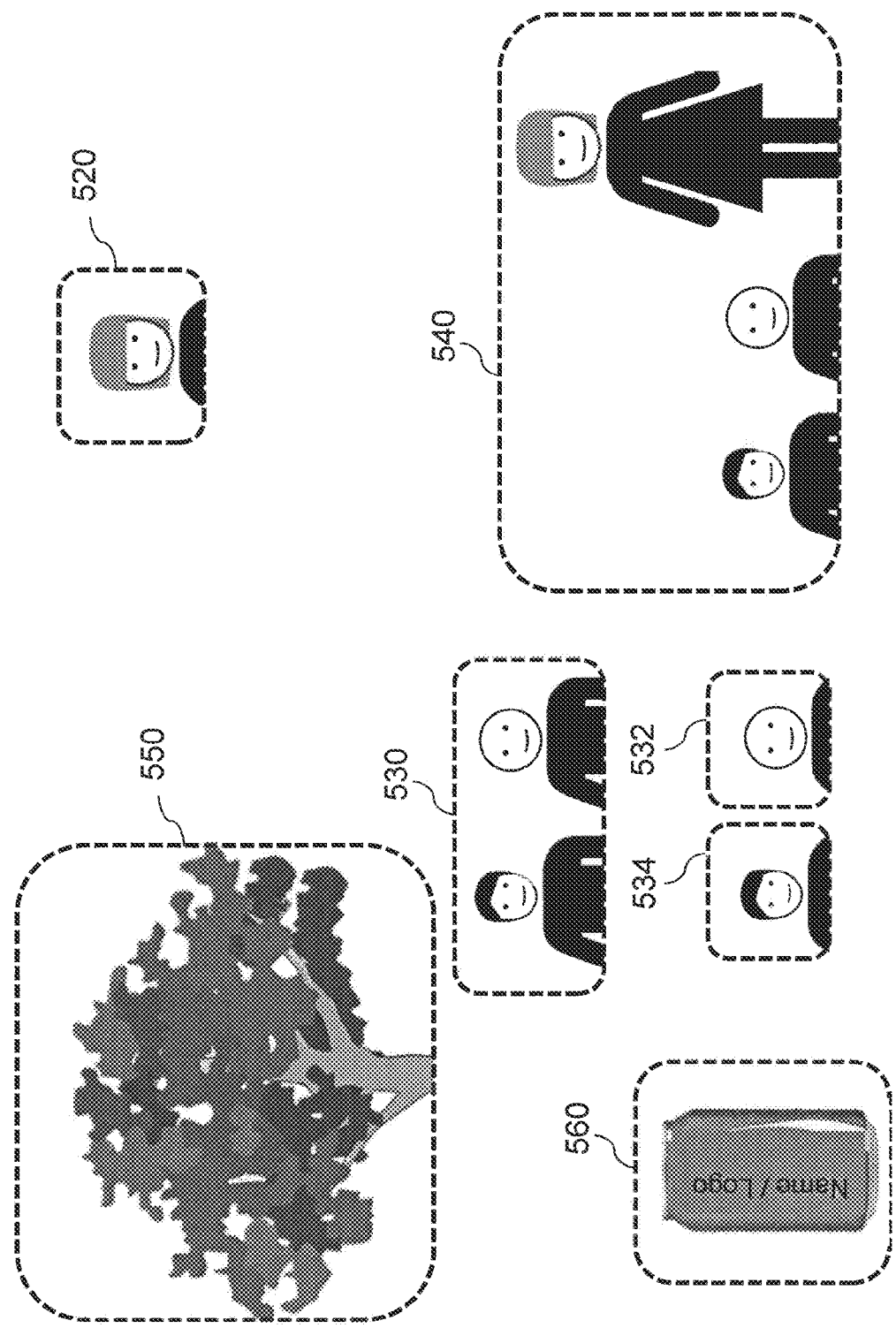
FIG. 5 illustrates the cropped images from FIG. 4, according to an embodiment.

In a similar manner, intelligent cropping system 200 generates a number of additional cropped areas of image 410 in response to rules regarding a social media website. (FIG. 5 illustrates the finished cropped images associated with the images in FIG. 4, according to an embodiment.)

Intelligent cropping system 200 uses pre-defined rules to crop an image that are based on an image's resolution, aspect ratio, pixel size and density of a sending and receiving display device. In addition, the rules can be based on the identity of the view, their relationship to the objects or people in the image, who owns the image, the actors in the image, and the identity of the person who tagged an object or person in the image.

In an embodiment, the rules that control access to the content of the composite image include the following rules R1-RX. For rules R1-RX, the following terms apply: A "poster" is a person who posts an image to the social networking system. This poster may or may not be the copyright holder of the image. A poster can also be referred to as an "owner" as discussed above. A "connected third-party" is a person who is connected to the poster in the social networking system. An "unconnected third-party" is person who is not connected to the poster in the social networking system.

Rules R1-RX are non-limiting and intended to be illustrative. Rules R1-RX are listed below:

R1. When a poster posts an image, that person can view all parts of the image. For example all tagged people in an image are visible to the poster of the image without restriction.

R2. When an image is posted to a social media website, any third party can identify and tag another third party in the image.

R3. When a third party within a posted image has been identified and tagged, the poster of the image is notified. This notification to the poster includes the identity of the third party that performed the identification and tagging R4. When a third party is tagged in an image, a notification will be sent to the third party. Optionally, this notification includes an indication of other tagged third parties in the image.

R5. In a variation of R4, when a third party is tagged in an image, within the notification to the tagged third party, a composite image is provided that includes images of other tagged third parties in the image. Optionally, only people or objects who are connected to the tagged third party are included in the notification. Therefore, a tagged third party will receive a composite image of another tagged third parties or objects to whom they are connected in the social media website.

R6. When a search is performed, a posted image with tagged third parties and/or objects can be provided as a result in a list of results. The results of a search generates a composite image that includes the searched upon object or third party.

As would be appreciated by one having skill in the relevant art(s), rules R1-RX can be used individually or in combination. Fewer or additional rules can be used by different embodiments.

Given the above rules, the following scenarios describe possible scenarios used by intelligent cropping system 200, and image cropping module 240:

Scenario #1

Owner captures image 410 and posts it to a social media website

Third party person A recognizes persons 320, 330, and 340 in the posted photo and tags persons 320, 330, and 340

Owner receives a notification that third party person A has tagged persons 320, 330, and 340. Intelligent cropping system 200 creates cropped image 440 that includes all three tagged people's faces with an appropriate, based on an analysis of the image composition, amount of additional image. Cropped image 540 illustrates the result. The notification also includes a copy of the cropped image, in this example, cropped image 540, which, in an embodiment is depicted as notification 120 in FIG. 1.

Person 320 will receive a notification that she has been tagged in a photo where intelligent cropping system 200 creates cropped image 420 that includes her face and the immediate area around her, which could also include other adjacent faces. In addition, the notification can include the names of other people or things that are also tagged in the same photo. Cropped image 520 illustrates the result.

Person 330 will receive a notification that he has been tagged in a photo where intelligent cropping system 200 creates cropped image 432 that includes only his face and the immediate area around him. Cropped image 532 illustrates the result.

Person 340 will receive a notification that he has been tagged in a photo where intelligent cropping system 200 creates cropped image 434 that includes only his face and the immediate area around him. Cropped image 534 illustrates the result.

Scenario #2

Owner captures image 410 and posts it to a social media website

Third party person B receives a post that persons 330 and 340 have been tagged. Third party person B is connected with persons 330 and 340, but not with person 320. Intelligent cropping system 200 creates a cropped image 430 that includes only persons 330 and 340, not person 320. Cropped image 530 illustrates the result.

Scenario #3

Owner captures image 410 and posts it to a social media website

Third party person C enters a search for an image that includes a tree. Intelligent cropping system 200 creates a cropped image 450 that includes only cropped area 450 of the tree. Cropped image 550 illustrates the result.

Scenario #4

Owner captures image 410 and posts it to a social media website

Third party person D enters a search for an image that includes a "brand name." Intelligent cropping system 200 creates a cropped image 450 that includes only cropped area 460 showing the brand name beverage can. Cropped image 560 illustrates the result.

Intelligent image cropping is also performed based on environmental factors such as display characteristics of the receiving device. For example, a source image in a 16:9 format, when displayed on a screen/device with a 4:3 format would be cropped accordingly to conform with the display characteristics of the receiving device. In a similar fashion, the cropped image would also be adjusted according to screen density, or resolution of the source image, to allow for the appropriate display of a cropped image.

Figure 6:
FIG. 6 illustrates a source image illustrating size versus detail, according to an embodiment.
Figure 7A:
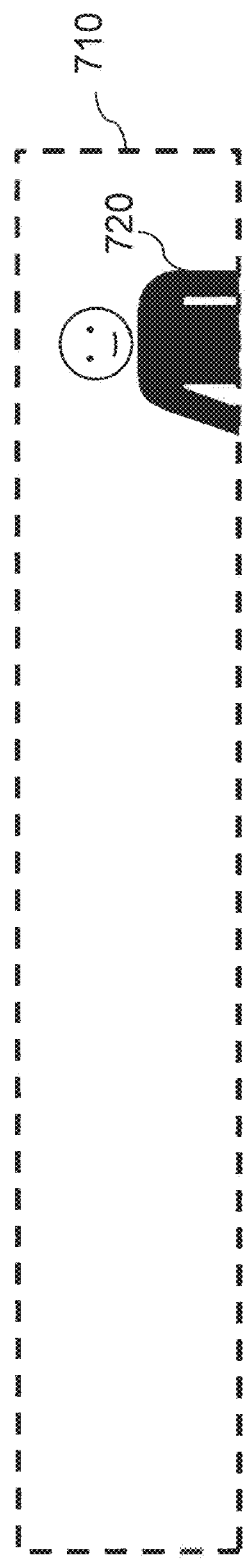
FIGS. 7A and 7B illustrates a cropped image of FIG. 6 illustrating placement of an object in the image, according to embodiments.
Figure 7B:

FIG. 6 is an example source image 610 of a large tree 630 and a smaller person 620 to illustrate size of the image versus clarity, according to an embodiment. Some scenarios in a social media website allow for the posting of a scaled photo, without being cropped. FIG. 6 is an example where if the full size image is scaled down then the detail in person 620 will possibly be lost as the image of person 620 would be very small. For example, an original source image could consist of a 5000 pixel by 2000 pixel image, which if reduced to a 16 pixel by 16 pixel profile image, will lose most of the detail contained in the original image. Intelligent cropping system 200, in order to preserve some of the detail of the image of person 620 will crop the image, for example, as shown in FIG. 7A, according to an embodiment. Note that the overall shape of cropped image 710 is preserved from source image 610. The viewer of cropped image 710 can see the detail of person 720 in addition to noting that person 720 is located at the right edge of the picture, just as he was located in source image 610. In an another embodiment, a combination of cropping and scaling is used whereby the image detail is maintained and some amount of cropping is also used. Such an example is shown in FIG. 7B where person 720 is viewable with most of the detail contained in the original image being retained, but also with a scaled down view of large tree 630.

In an embodiment, if the source image only contains a portion of a desired object, e.g., one side of a person's face, a facial recognition system can be used to identify the person associated with the face, given that enough facial information was available in the source image. Intelligent cropping system 200 could then substitute a different source image of the identified person, e.g., an image containing the entire face of the identified person from image storage device 210.

Figure 8:
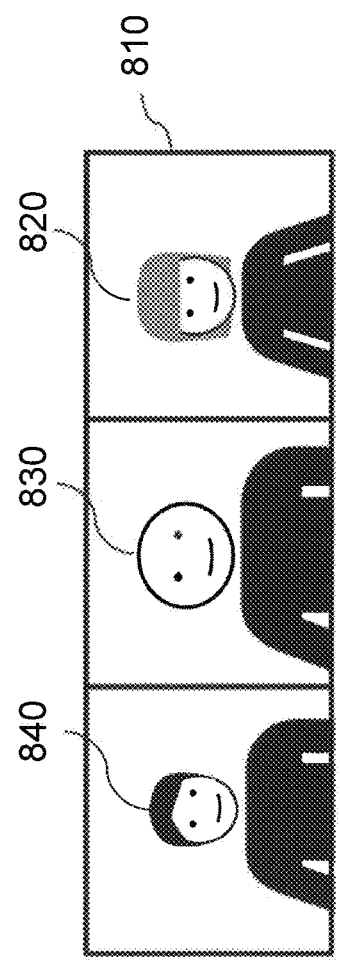
FIG. 8 illustrates a composite cropped image, according to an embodiment.

FIG. 8 is an example of composite cropping in cropped image 810, according to an embodiment. In the case of a source image that consists of multiple images, where if cropped to only include the desired images would result in the person's face or the object of interest being smaller than a set threshold, or in a cropped image that is no smaller than the source image, intelligent cropping system 200 will generate a composite image, such as is shown in composite image 810. Such an image retains the detail of each desired subject, e.g., persons 820, 830 and 840, but loses the spatial relationship placement between the images in the source image. However, a notification that is sent in a social media system still conveys to the recipient the nature of the photo that includes the other identified people and/or objects in the source image.

V. Methods

Methods in accordance with embodiments will be described with respect to the intelligent cropping system and methodologies described in FIGS. 1-8.

Figure 9:
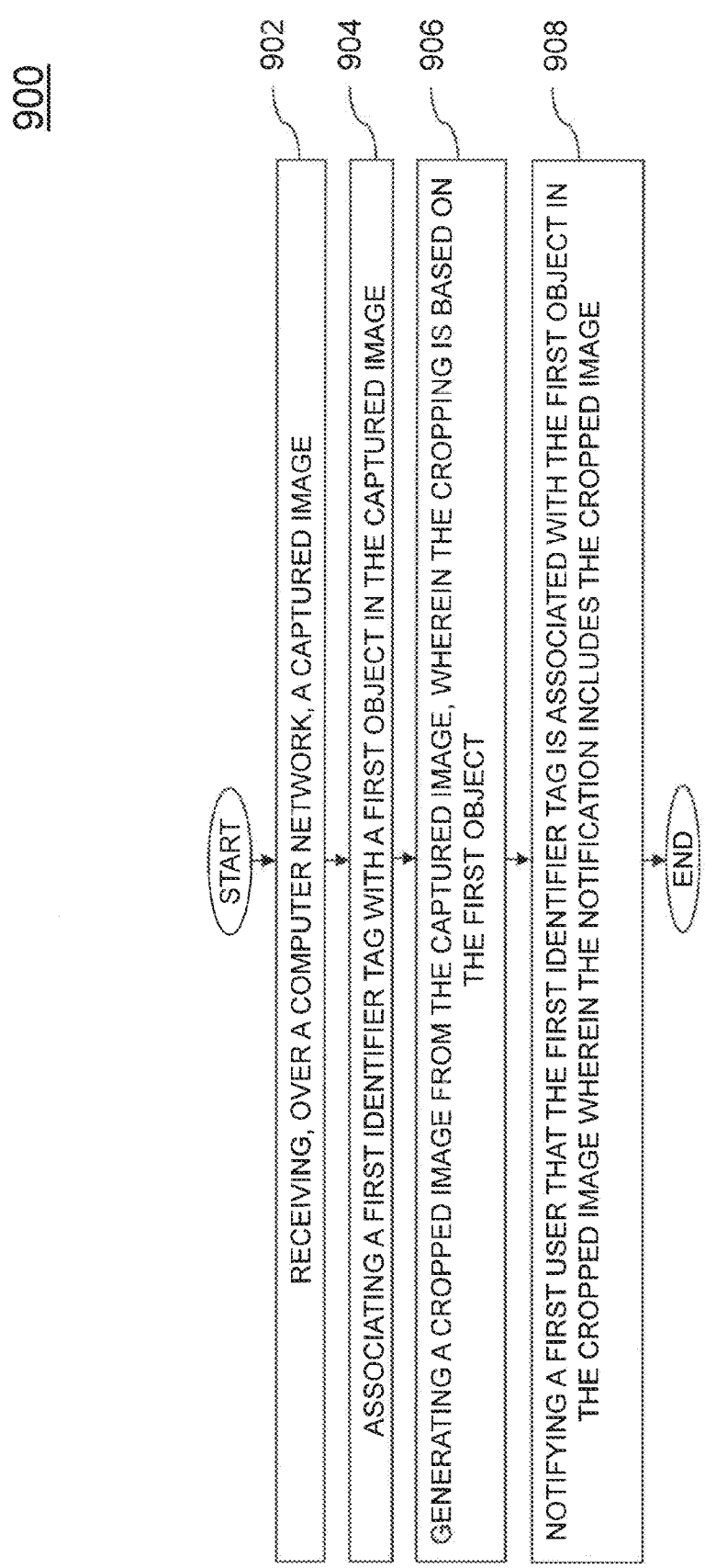
FIG. 9 and FIG. 10 are flowcharts of intelligently cropped image methods, according to an embodiment.

FIG. 9 is a flowchart of an exemplary method 900 for intelligent cropping of image, according to an embodiment of the present invention. For ease of explanation, method 900 is described with respect to intelligent cropping system 200 of FIG. 2 using the methodology described in FIGS. 1 and 3-8, but embodiments of the method are not limited thereto.

Method 900 starts with step 902 that includes receiving, over a computer network, a source image. In an embodiment, intelligent cropping system 200 receives and stores a source image in image storage device 210 where the image data can exist in any defined image format. Method 900 continues to step 904 by associating a first identifier tag with a first object in the source image. In an embodiment, recognition module 220 of intelligent cropping system 200 analyzes a source image to identify objects and/or people within the image. Association module 230 of intelligent cropping system 200, using the analysis or recognition module 220, associates an identifier tag with an identified object or person with the source image. A source image can contain multiple people and/or objects and thus contain multiple identifier tags.

Method 900 continues to step 906 by generating a cropped image from the source image, wherein the cropping is based on the first object. In an embodiment, image cropping module 240 intelligently crops the source image based on the identified objects and/or people from recognition module 220 and association module 230 of intelligent cropping system 200. In an embodiment, a user may perform the functions of recognition module 220 and association module 230 by identifying and associated a person or object of interest. Whether the person/object is tagged with an identifier by a person or intelligent cropping system 200, imaging cropping module 240 crops the image based on pre-defined rules as discussed above.

Method 900 continues to step 908 by notifying a first user that the first identifier tag is associated with the first object in the cropped image wherein the notification includes the cropped image. In an embodiment, notification module 250 notifies the person or object that was associated with an identifier tag by recognition module 220 and association module 230 of the existence of the cropped image. The notification also includes a copy of the cropped image. In addition, the cropped image may also include multiple people and/or objects based on the pre-defined rules that govern which objects/people are to be shown in the intelligently cropped image. For example, as discussed above when an owner receives a notification that a third party person has tagged persons 320, 330, and 340. Intelligent cropping system 200 creates cropped image 440 that includes all three tagged people's faces with a minimum of additional image. Method 900 then concludes.

Figure 10:
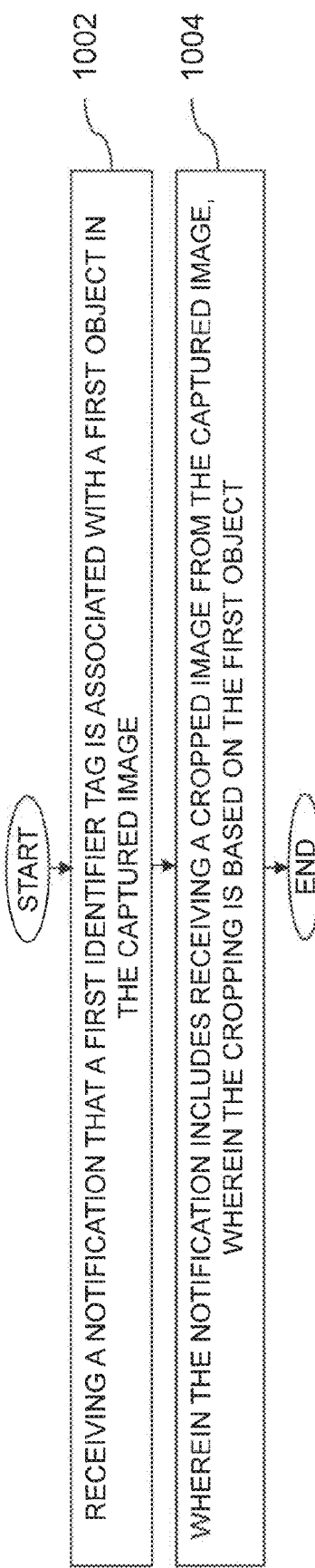

FIG. 10 is a flowchart of an exemplary method 1000 for intelligent cropping of image, according to an embodiment of the present invention. For ease of explanation, method 1000 is described with respect to intelligent cropping system 200 of FIG. 2 using the methodology described in FIGS. 1 and 3-8, but embodiments of the method are not limited thereto.

Method 1000 starts with step 1002 by receiving a notification that a first identifier tag is associated with a first object in the source image. In an embodiment, referring to scenario #1, after the owner submits source image 410 to a social media website, the owner receives a notification that a third party person has tagged persons 320, 330 and 340. Method 1000 continues to step 1004 wherein the notification includes receiving a cropped image from the source image wherein the cropping is based on the first object. In an embodiment, referring to scenario #1, the owner receives the notification where the notification also includes a copy of the cropped image, in this example, cropped image 540, which, in an embodiment is depicted as notification 120 in FIG. 1.

VI. Example Computer System Implementation

Aspects of the present invention shown in FIGS. 1-10, or any part(s) or function(s) thereof, may be implemented using hardware, software modules, firmware, tangible computer readable media having instructions stored thereon, or a combination thereof and may be implemented in one or more computer systems or other processing systems.

Figure 11:
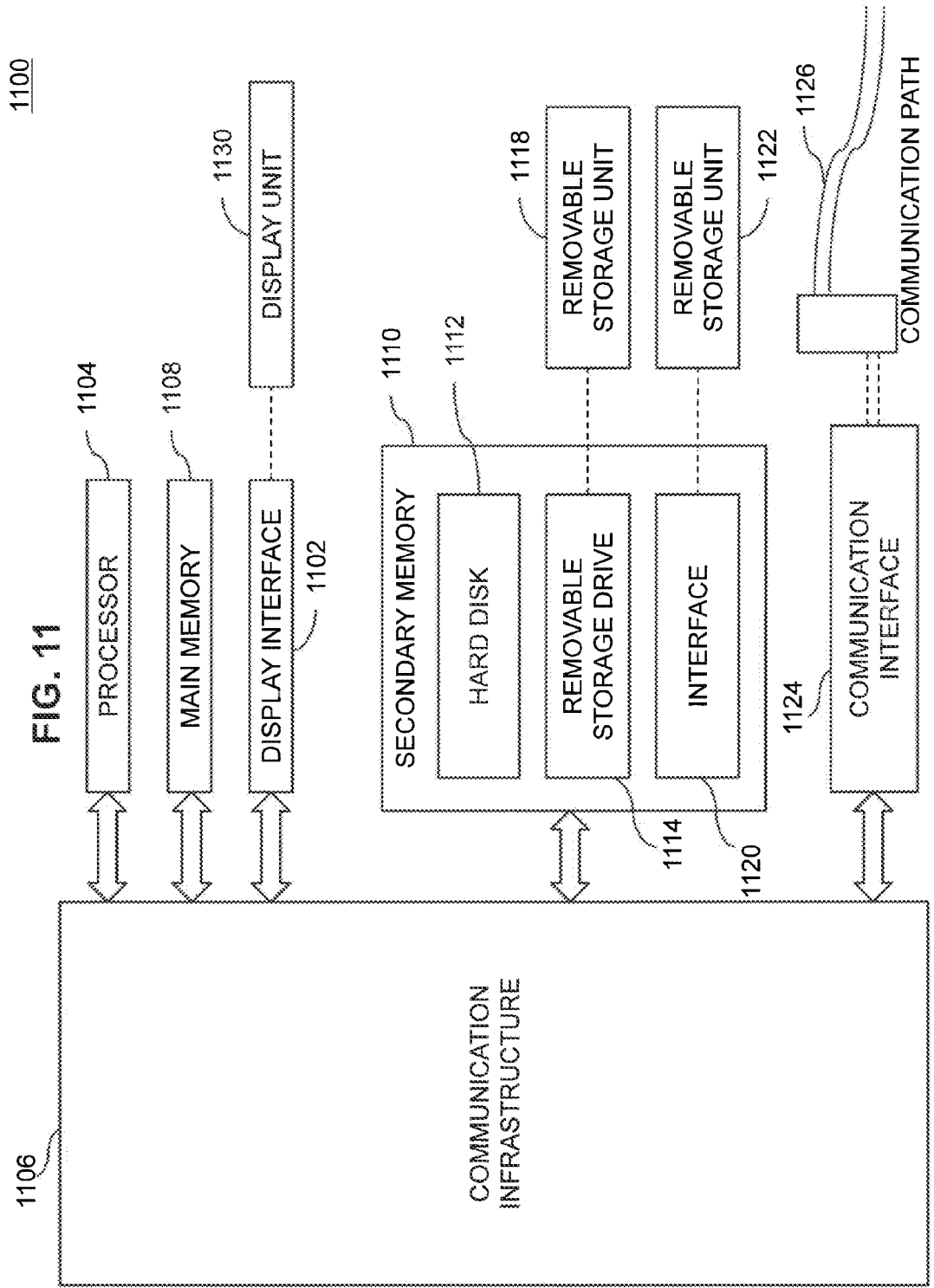
FIG. 11 is a diagram of an example computer system in which embodiments can be implemented.

FIG. 11 illustrates an example computer system 1100 in which embodiments of the present invention, or portions thereof, may be implemented as computer-readable code. For example, system 200 may be implemented in computer system 1100 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-7.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 1100. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1104 may be a special purpose or a general purpose processor device. As will be appreciated by persons skilled in the relevant art, processor device 1104 may also be a single processor in a multi-core/multiprocessor system, such system operating alone, or in a cluster of computing devices operating in a cluster or server farm. Processor device 1104 is connected to a communication infrastructure 1106, for example, a bus, message queue, network, or multi-core message-passing scheme.

Computer system 1100 also includes a main memory 1108, for example, random access memory (RAM), and may also include a secondary memory 1110. Secondary memory 1110 may include, for example, a hard disk drive 1112, removable storage drive 1114. Removable storage drive 1114 may comprise a floppy disk drive, a magnetic tape drive, an optical disk drive, a flash memory, or the like. The removable storage drive 1114 reads from and/or writes to a removable storage unit 1118 in a well-known manner. Removable storage unit 1118 may comprise a floppy disk, magnetic tape, optical disk, etc. which is read by and written to by removable storage drive 1114. As will be appreciated by persons skilled in the relevant art, removable storage unit 1118 includes a computer usable storage medium having stored therein computer software and/or data.

Computer system 1100 (optionally) includes a display interface 1102 (which can include input/output devices such as keyboards, mice, etc.) that forwards graphics, text, and other data from communication infrastructure 1106 (or from a frame buffer not shown) for display on display unit 1130.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a communications interface 1124. Communications interface 1124 allows software and data to be transferred between computer system 1100 and external devices. Communications interface 1124 may include a modem, a network interface (such as an Ethernet card), a communications port, a PCMCIA slot and card, or the like. Software and data transferred via communications interface 1124 may be in the form of signals, which may be electronic, electromagnetic, optical, or other signals capable of being received by communications interface 1124. These signals may be provided to communications interface 1124 via a communications path 1126. Communications path 1126 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1118, removable storage unit 1122, and a hard disk installed in hard disk drive 1112. Computer program medium and computer usable medium may also refer to memories, such as main memory 1108 and secondary memory 1110, which may be memory semiconductors (e.g. DRAMs, etc.).

Computer programs (also called computer control logic) are stored in main memory 1108 and/or secondary memory 1110. Computer programs may also be received via communications interface 1124. Such computer programs, when executed, enable computer system 1100 to implement the present invention as discussed herein. In particular, the computer programs, when executed, enable processor device 1104 to implement the processes of the present invention, such as the stages in the method illustrated by flowcharts 900 of FIG. 9 and 1000 of FIG. 10 as discussed above. Accordingly, such computer programs represent controllers of the computer system 1100. Where the invention is implemented using software, the software may be stored in a computer program product and loaded into computer system 1100 using removable storage drive 1114, interface 1120, and hard disk drive 1112, or communications interface 1124.

Embodiments of the invention also may be directed to computer program products comprising software stored on any computer usable medium. Such software, when executed in one or more data processing device, causes a data processing device(s) to operate as described herein. Embodiments of the invention employ any computer usable or readable medium. Examples of computer usable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

VII. Conclusion

Embodiments described herein provide methods and apparatus for the automatic cropping of images. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A computer-implemented method for intelligently cropping images, comprising:
    receiving, over a computer network, a source image;
    associating a first identifier tag with a first object in the source image;
    automatically generating a cropped image from the source image, based on the first object and one or more pre-defined rules, wherein the pre-defined rules are based on social media relationships to the first object in a social networking system; and
    notifying a first user that the first identifier tag is associated with the first object in the cropped image, wherein the notification includes receiving the cropped image which has been cropped from the source image based on the first object and one or more pre-defined rules, wherein the pre-defined rules are based on social media relationships to the first object in a social networking system.

2. The method of claim 1, wherein the associating is performed by a second user.

3. The method of claim 2, wherein the second user is a social media connection of the first user.

4. The method of claim 1, wherein the associating is performed by a computer-based recognizing and identifying process.

5. The method of claim 1, wherein the first object is a person.

6. The method of claim 1, wherein the received source image is from the owner of the image.

7. The method of claim 1, wherein the notification includes a source of the associating.

8. The method of claim 1, further comprising associating a second identifier tag with a second object in the source image.

9. The method of claim 8, wherein the notification of the first user includes the cropped image that includes the first and second object.

10. The method of claim 8, further comprising notifying a second user wherein the notifying the second user includes where the generated cropped image includes the first object but not the second object.

11. The method of claim 10, wherein the second user is a social media connection of the first object but is not a social media connection of the second object.

12. A device for intelligently cropping images, the device comprising one or more processors configured to perform the operations including:
    receiving a notification that a first identifier tag is associated with a first object in a source image; and
    automatically generating a cropped image from the source image, based on the first object and one or more pre-defined rules, wherein the pre-defined rules are based on social media relationships to the first object in a social networking system,
    wherein the notification includes receiving the cropped image based on the source image wherein the cropping is based on the first object and one or more pre-defined rules, and wherein the pre-defined rules are based on social media relationships to the first object in the social networking system.

13. The device of claim 12, wherein the operations further comprise sending the source image to a social media website, wherein the sending is performed by a first user.

14. The device of claim 13, wherein the associating is performed by a second user.

15. The device of claim 14, wherein the second user is a social media connection of the first user.

16. The device of claim 12, wherein the first identifier tag is associated with the first object by a computer-based recognizing and identifying process.

17. The device of claim 12, wherein the first object is a person.

18. The device of claim 12, wherein the operations further comprise sending the source image to a social media website, wherein the sending is performed by the owner of the image.

19. The device of claim 12, wherein the notification further comprises a source of the associating.

20. The device of claim 12, wherein the notification further comprises that a second identifier tag is associated with a second object in the source image.

21. The device of claim 20, wherein the cropped image includes the first and second object.

22. The device of claim 20, wherein the operations further comprise a second user receiving a notification wherein the notification includes a cropped image that includes the first object but not the second object.

23. The device of claim 22, wherein the second user is a social media connection of the first object but is not a social media connection of the second object.

24. A system, comprising:
    a processor;
    a memory coupled to the processor;
    an image storage module configured to be executed by the processor and further configured to store uploaded source images;
    an association module configured to be executed by the processor and further configured to associate a first identifier tag with a first object in the source image;
    an image cropping module configured to be executed by the processor and further configured to automatically generate a cropped image from the source image wherein the cropping is based on the first object and one or more pre-defined rules, wherein the pre-defined rules are based on social media relationships to the first object in a social networking system;
and a notification module configured to be executed by the processor and further configured to notify a first user that the first identifier tag is associated with the first object in the cropped image, wherein the notification includes receiving the cropped image which has been cropped from the source image based on the first object and one or more pre-defined rules, wherein the pre-defined rules are based on social media relationships to the first object in a social networking system.

* * * * *